US007814634B2

(12) United States Patent
Francis et al.

(10) Patent No.: US 7,814,634 B2
(45) Date of Patent: Oct. 19, 2010

(54) ELECTRICAL CONNECTOR EXTRACTION AND/OR INSERTION TOOL

(75) Inventors: Errol Gladstone Francis, Burlington, NJ (US); Ray C Mitchell, Lake Hiawatha, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 827 days.

(21) Appl. No.: 11/180,812

(22) Filed: Jul. 13, 2005

(65) Prior Publication Data

US 2007/0011857 A1 Jan. 18, 2007

(51) Int. Cl.
*B23P 19/00* (2006.01)
*H01R 4/48* (2006.01)

(52) U.S. Cl. .......................... 29/426.5; 29/764; 29/762; 29/758; 29/753

(58) Field of Classification Search .................. 29/764, 29/753, 783, 747, 566.3, 564.1, 762, 758, 29/270, 278, 426.5; 439/131, 172, 104, 582, 439/877, 595, 832; 81/180.1, 177.2, 483, 81/431, 478.52, 439, 832, 53.1; 279/145, 279/30, 14

See application file for complete search history.

(56) References Cited

U.S. PATENT DOCUMENTS

| | | | | | |
|---|---|---|---|---|---|
| 3,197,849 | A | * | 8/1965 | Johnson | 29/747 |
| 3,257,713 | A | * | 6/1966 | Floyd Jr Edwin | 29/752 |
| 3,903,576 | A | * | 9/1975 | Stein | 29/764 |
| 4,367,663 | A | * | 1/1983 | Merics | 81/177.2 |
| 4,374,604 | A | * | 2/1983 | Hemmer et al. | 439/587 |
| 4,754,670 | A | * | 7/1988 | Raymond | 81/177.2 |
| 4,852,925 | A | * | 8/1989 | Lodin | 294/2 |
| 4,912,841 | A | * | 4/1990 | Noschese | 29/764 |
| 4,920,637 | A | * | 5/1990 | Meyerhoefer et al. | 29/764 |
| 5,119,547 | A | * | 6/1992 | Ii | 29/764 |
| 5,129,293 | A | * | 7/1992 | Larson et al. | 81/483 |
| 5,405,271 | A | * | 4/1995 | Bauer et al. | 439/480 |
| 5,413,575 | A | * | 5/1995 | Haenggi | 606/45 |
| 5,638,474 | A | * | 6/1997 | Lampert et al. | 385/78 |
| 5,709,136 | A | * | 1/1998 | Frenkel | 81/57.13 |
| 6,817,089 | B2 | * | 11/2004 | Whitehead | 29/762 |
| 7,020,376 | B1 | * | 3/2006 | Dang et al. | 385/135 |

* cited by examiner

*Primary Examiner*—Derris H Banks
*Assistant Examiner*—Tai Nguyen
(74) *Attorney, Agent, or Firm*—McCormick, Paulding & Huber LLP

(57) ABSTRACT

A tool for extracting or inserting a connector into a connector receptacle includes a tool body having an elongated shape with a first end and a second end. The first end is adapted to engage and stabilize the connector.

19 Claims, 8 Drawing Sheets

ELECTRICAL CONNECTOR EXTRACTION AND/OR INSERTION TOOL

FIELD OF THE INVENTION

The present invention relates to electrical connectors and, more particularly, to a tool for use with electrical connectors.

BACKGROUND OF THE INVENTION

Electrical connectors are used extensively on circuit packs located in tight spaces on digital shelves. Moreover, the trend in electronic packaging is to pack the electronics in tighter and tighter. Thus, in some cases, electrical connectors are difficult to reach and manipulate by hand. One commonly used type of connector is a registered jack connector or RJ connector (also referred to as a modular connector). Typically, as shown in FIG. 1A, an RJ connector plug/receptacle assembly 100 includes an RJ connector plug 102 and a receptacle or jack 104. The RJ connector plug has a resilient locking tab 106 extending from the body 108 of the plug at approximately a 15 degree angle. When the RJ connector plug 102 is mated with the connector receptacle 104, the locking tab 106 is designed to extend away from the body 108 of the plug and to come into locking engagement with an inner locking edge 110 of the connector receptacle: 104. During extraction or insertion of the RJ connector plug into the connector receptacle, the locking tab 106 may be deflected toward the body 108 of the plug, as shown in FIG. 1B. When space permits, this deflection of the locking tab is accomplished with a finger. When placed in tight, difficult to reach spaces, the interaction of the locking tab feature on the RJ connector plug with the connector receptacle makes extraction and insertion of these connectors difficult at best and sometimes adversely impacts the real-time servicing of on-line revenue generating systems.

For example, when extracting RJ connector plugs from their connector receptacles, technicians routinely use a flat blade screwdriver to depress the locking tab of the latching mechanism of the connector plug, then pull on the cable itself to extract the RJ connector plug. This leads to cable or electrical lead failure, intermittent electrical performance, broken locking tabs of the RJ connectors and many lost technician troubleshooting hours.

For RJ connector plug insertion, technicians use their hands for aligning the plug with the connector receptacle. This means pushing other cable assemblies out of the way and holding the cable of the RJ connector plug in order to guide and mate the connector plug with the connector receptacle.

Thus, a tool for effectively and safely assisting in the extraction and/or insertion of RJ connector plugs from their connector receptacles without damaging the connector, the locking tab, the cable, the conductive terminals or electrical leads is desired. In addition, a tool for assisting in the extraction and/or insertion of RJ connector plugs into their connector receptacles and which requires only one hand for performing the extraction and/or insertion is desired.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a tool is provided for extracting or inserting a connector into a connector receptacle includes a tool body having an elongated shape with a first end and a second end. The first end is adapted to engage and stabilize the connector.

In another embodiment of the present invention, a tool is provided for extracting a connector having a locking tab from a connector receptacle includes a tool body having an elongated shape with a first end and a second end wherein the first end is adapted to engage the locking tab of the connector and wherein the first end includes a stabilizing element.

In yet another embodiment of the present invention, a method is provided for extracting a connector having a locking tab in locking engagement with a connector receptacle using a tool is disclosed. The method includes contacting an end of the tool to the locking tab, engaging the connector with a stabilizing element disposed on the tool and moving the end of the tool to engage the locking tab to release the locking engagement of the locking tab from the connector receptacle.

These and other embodiments will become apparent to those skilled in the art from the following detailed description read in conjunction with the appended claims and the drawings attached hereto.

BRIEF DESCRIPTION OF THE DRAWINGS

The present invention will be better understood from reading the following description of non-limiting embodiments, with reference to the attached drawings, wherein below.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

Figure 1A:
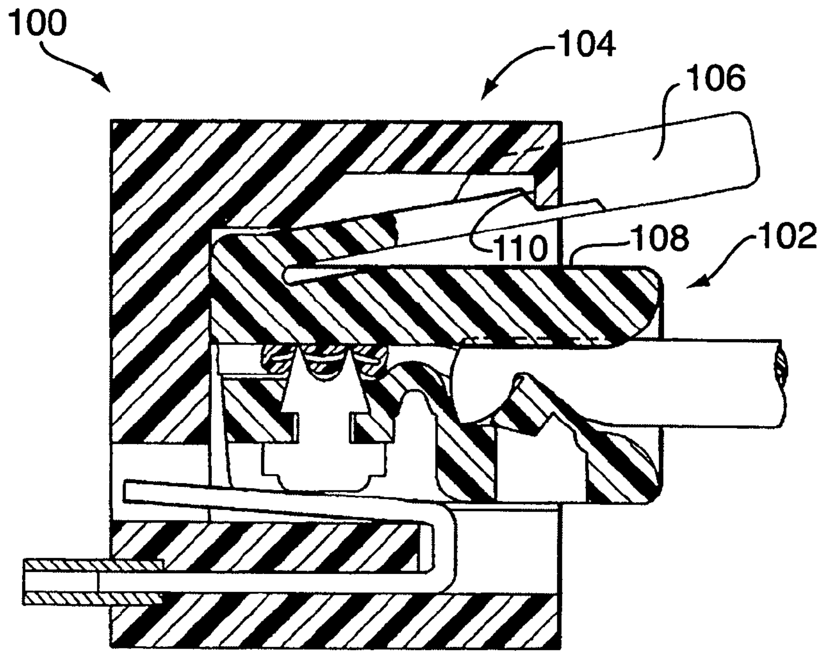
FIG. 1A Prior Art
FIGS. 1A and 1B are cross-sectional views of a typical RJ connector plug and connector receptacle assembly.
Figure 1B:
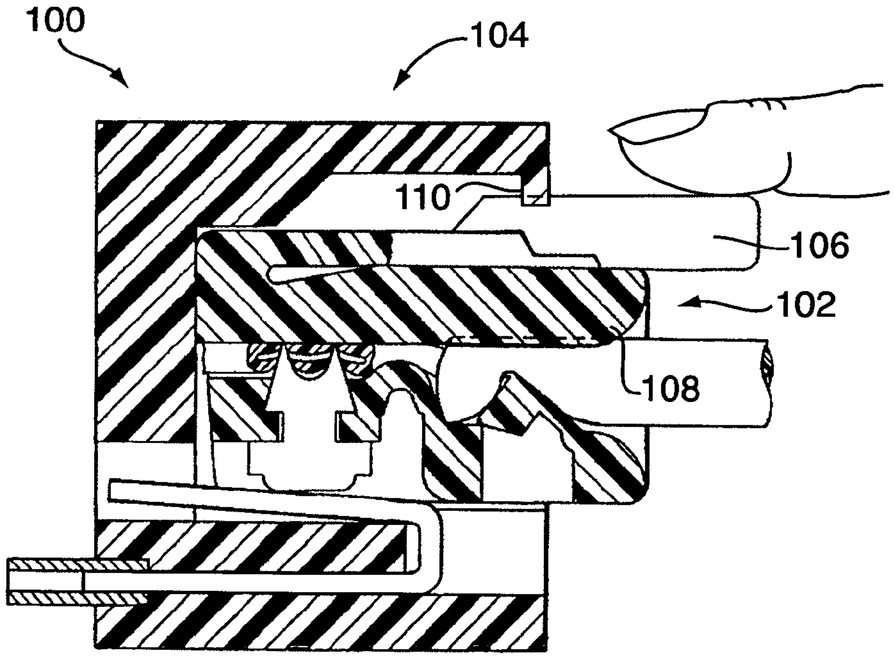
FIG. 1B Prior Art
Figure 2:
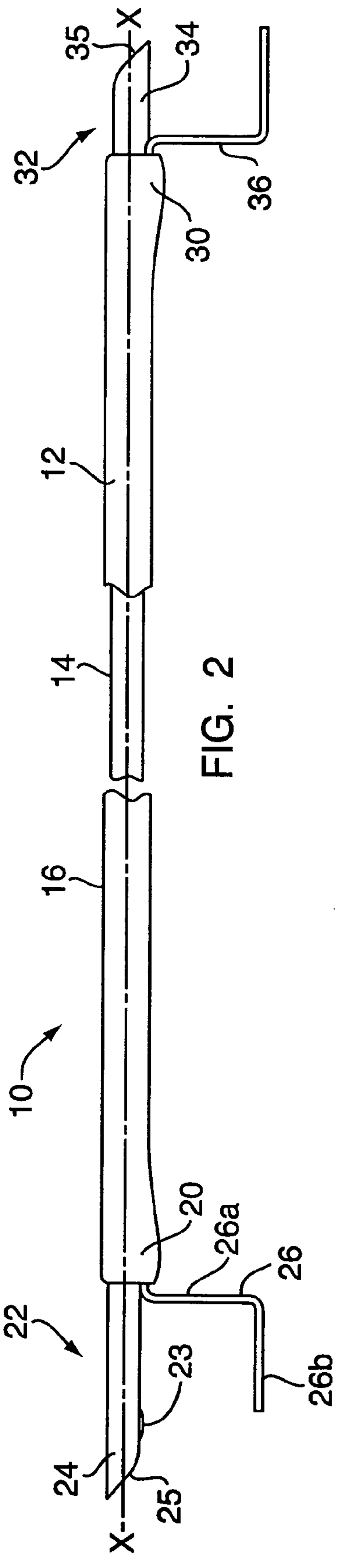
FIG. 2 is a schematic side view of a tool according to a representative embodiment of the present invention.
Figure 3:
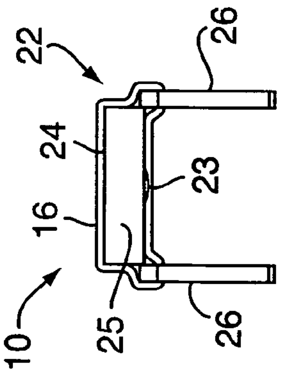
FIG. 3 is a schematic end view of the tool shown in FIG. 2.

With reference to FIGS. 2 and 3, one representative embodiment of a tool 10 for extracting RJ connector plugs from their connector receptacles includes an elongated handle portion 12 defining a longitudinal axis X-X. Handle portion 12 has a first end portion 20 and a second end portion 30, opposite first end portion 20. An extraction portion 22 is coupled to first end portion 20. Extraction portion 22 includes a deflector arm 24 and stabilizing element 26. When the same tool 10 is also used for inserting RJ connector plugs into their connector receptacles, tool 10 includes an insertion portion 32 coupled to second end portion 30. Insertion portion 32 includes an insertion arm 34 and stabilizing element 36.

In the embodiment of FIGS. 2 and 3, handle portion 12 is shown as having a central core 14 and an outer covering 16. Central core 14 is relatively long and thin and could be formed as a rod or a strip. As a non-limiting example, central core 14 may be formed as a strip having a length of approximately 10 to 12 inches, a width of approximately ½ to ¾ inches and a thickness of approximately 1/10 to ⅛ inches. As another non-limiting example, central core 14 may be formed more as a rod having a length of approximately 8 to 10 inches and a cross-sectional area of approximately 0.01 to 0.02 square inches. The specific dimensions of central core 14 will depend upon the desired stiffness of tool 10, and thus of handle 12, and the material from which central core 14 is made. Central core 14 may be robustly made of metal, for instance steel or aluminum, or provided in a lighter weight version of plastic or fiber-reinforced composites. Any suitably stiff material, as known to persons of ordinary skill in the art, lies within the scope of the present invention.

Outer covering 16 is optional, but if provided, it extends over at least a portion of central core 14. Outer covering 16 may be provided to increase the stiffness characteristics of handle 12, to electrically insulate the user from any potential shocks and/or to improve the grip. Thus, as non-limiting examples, outer covering 16 may be formed as a plastic sheath molded or shrink wrapped to central core 14, as a foam grip, or as a fiber-reinforced composite wrapped or injection molded around handle 12.

Extraction portion 22 is coupled to first end portion 20 of handle 12. Extraction portion 22 is used to unplug the RJ connector plug from the connector receptacle. In particular, extraction portion 22 provides a reliable and efficient means to unlock the locking tab of the RJ connector plug from the connector receptacle, thereby allowing the plug to be uncoupled and removed from the connector receptacle. Extraction portion 22 includes deflector arm 24 and stabilizing element 26.

Deflector arm 24 extends longitudinally in a distal direction from first end portion 20 of handle 12. Deflector arm 24 may be an extension of central core 14 of handle 12 (i.e. integrally formed with central core 14) or it may be a separate element affixed to first end portion 20. As shown in FIG. 2, deflector arm 24 may be provided with a slanted or ramped leading edge 25. Although deflector arm 24 may be any length consistent with extending over the length of an RJ connector plug, in the embodiment shown in FIG. 2, the length of deflector arm 24 is approximately ⅝ inches.

Figure 8A:
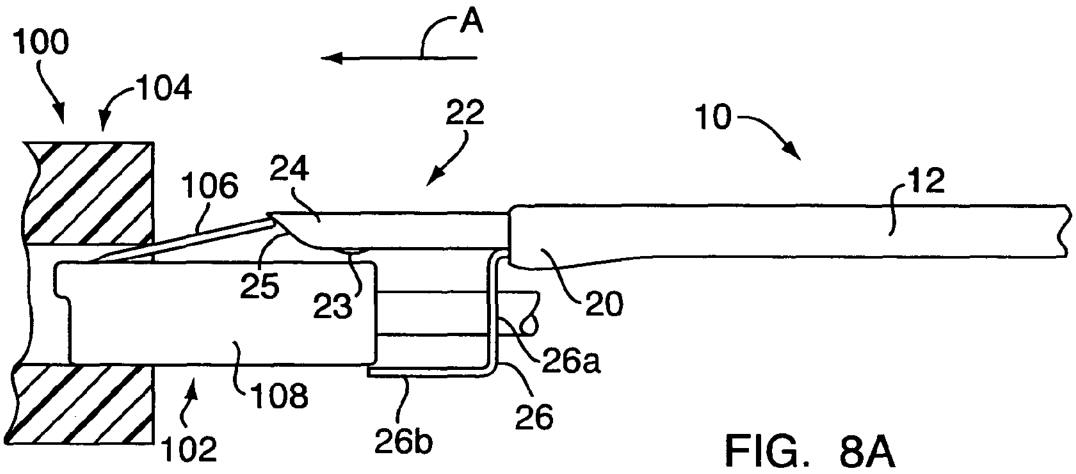
FIGS. 8A through 8C show the extraction of an RJ connector plug using the tool of FIG. 2.
Figure 8B:
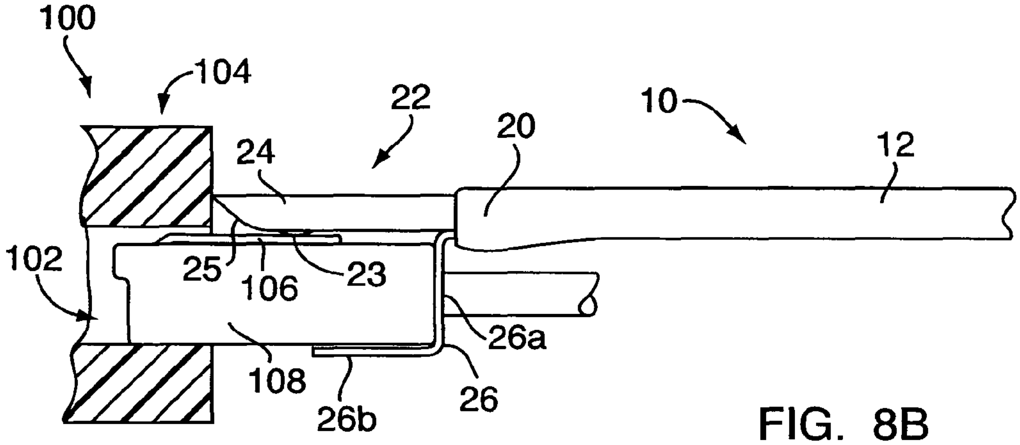

Referring to FIGS. 8A and 8B, during extraction of an RJ connector plug, deflector arm 24 contacts the locking tab of the plug and deflects the locking tab toward the body of the plug. Ramped leading edge 25 provides a surface for deflector arm 24 to contact the free end of the locking tab of the RJ connector plug and, as deflector arm 24 is pushed over the proximal end of the plug, to guide and drive the free end of the locking tab in towards the body of the RJ connector plug.

Referring back to FIG. 2, deflector arm 24 may also be provided with a protrusion or button 23 located on a surface of the deflector arm that faces the RJ connector plug. As shown in FIG. 2, button 23 is located adjacent the distal end of deflector arm 24. Button 23 may be integrally formed as part of deflector arm 24 or may be affixed in a secondary manufacturing operation, such as bonding, riveting, welding, etc.

With reference to FIGS. 8A and 8B, during extraction of an RJ connector plug from a connector receptacle, button 23 is brought into contact with the locking tab and mechanically assists in the final deflection of the locking tab as the locking tab is brought parallel to the body of the RJ connector plug.

As shown in the representative embodiment of FIGS. 2 and 3, extraction portion 22 also includes stabilizing element 26. Stabilizing element 26 is coupled to the proximal end of deflector arm 24. A first portion **26*a* of stabilizing element 26 extends away from the longitudinal axis of handle 12 and a second portion 26*b* extends distally from first portion 26*a* in a direction that is roughly parallel to the longitudinal axis. As best shown in FIG. 2, first portion 26*a* may extend away from deflector arm 24 in an approximately perpendicular direction. Alternatively, first portion 26*a* may extend away from deflector arm 24 at angles more or less than 90 degrees. Further, first portion 26*a* need not be straight. As non-limiting examples, first portion 26*a* may be formed as a semicircle with its concave surface facing the distal end of deflector arm 24 or as an S-shape. Slightly curving the distal end of second portion 26*b* away from deflector arm 24 may assist in the positioning of stabilizing element 26** around the body of the RJ connector plug.

In one aspect, stabilizing element 26 may be relatively stiff and designed to engage the body of the RJ connector and stabilize tool 10 during the deflection of the locking tab toward the body. According to this aspect, the minimum spacing between deflector arm 24 and second portion **26*b* could be slightly more than the thickness of the body of the RJ connector plug that is to be extracted from the connector receptacle. As a non-limiting example, a slip fit could be established between the tool and the body of the RJ connector plug. As best shown in FIGS. 8A and 8B, during extraction of the RJ connector plug from the connector receptacle, stabilizing element 26 is slipped over a portion of the body of the RJ connector plug. As deflector arm 24 is moved over and deflects the locking tab, stabilizing element 26 prevents deflector arm 24** from slipping off of and losing contact with the locking tab.

In general, stabilizing element 26 may be formed of any material with sufficient stiffness, including metals, plastics and composite materials, to prevent undesired movement of deflection arm 24 relative to the locking tab. As a non-limiting example, flat or round steel may be shaped to form stabilizing element 26.

To improve the stability of the tool during the extraction operation, more than one stabilizing element 26 may be provided. As best shown in the representative embodiment of FIG. 3, a stabilizing element 26 may be located to either side of deflector arm 24. Alternatively, more than one stabilizing element 26 may be located on extraction portion 22. In one aspect, two stabilizing elements 26 may be provided and coupled to deflector arm 24 such that the distance between the stabilizing elements 26 can accommodate the cable of the RJ connector plug. A width of ⅜ inches may accommodate the typical RJ connector plug cable. Further, stabilizing element 26 may be formed as an extension of central core 14 of handle 12 (i.e. integrally formed with central core 14) or it may be formed as a separate element that is mechanically (i.e. by welding, riveting, crimping, etc.) and/or chemically (i.e. by bonding, co-curing, etc.) affixed to extraction portion 22.

Figure 4:
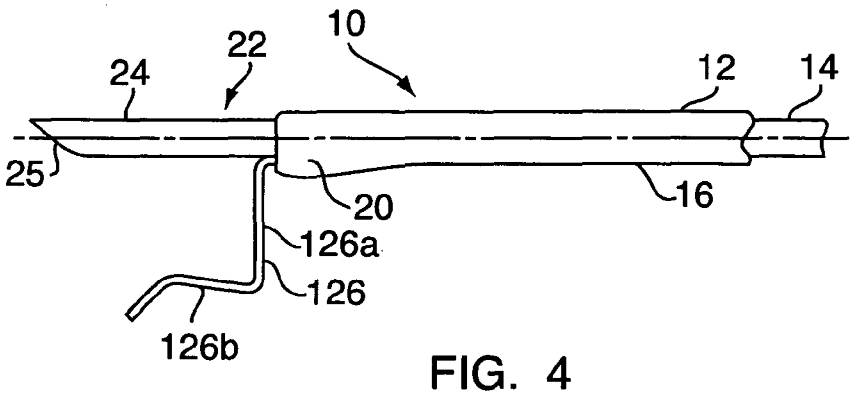
FIG. 4 is a schematic side view of a portion of a tool according to another representative embodiment of the present invention.
Figure 9A:
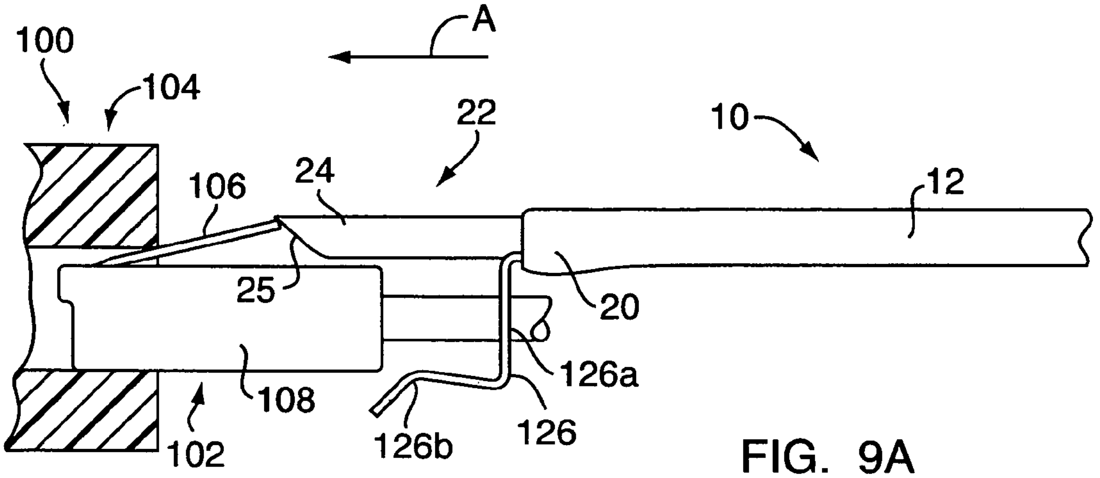
FIGS. 9A through 9C show the extraction of an RJ connector plug from a connector receptacle using the tool of FIG. 4.
Figure 9B:
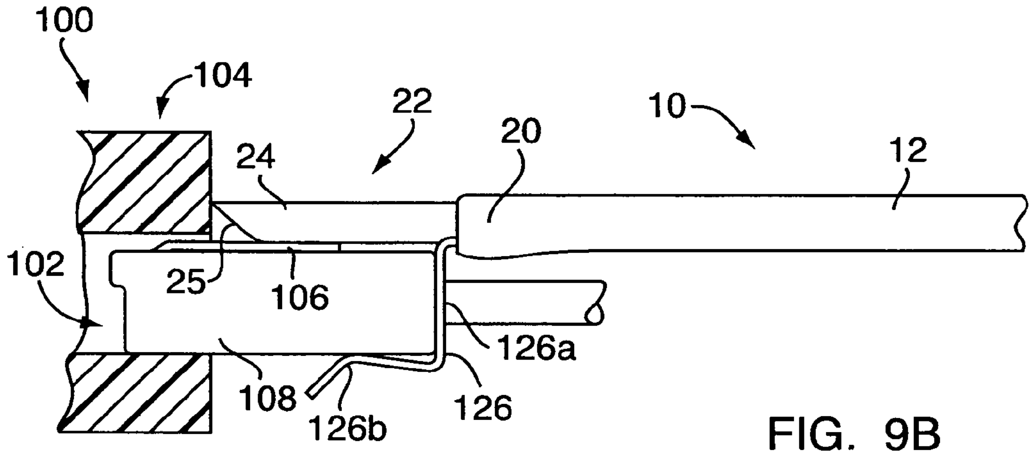

In another aspect as shown in FIG. 4, a resilient stabilizing element 126 may be provided. Resilient stabilizing arm 126 is designed to apply a grasping or gripping force to the body of the RJ connector. According to this aspect, the minimum spacing between deflector arm 24 and second portion 126*b* could be less than the thickness of the body of the RJ connector plug that is to be extracted from the connector receptacle. As best shown in FIGS. 9A and 9B, during extraction of the RJ connector plug from the connector receptacle, resilient stabilizing element 126 is slipped over a portion of the body of the RJ connector plug. When using resilient stabilizing element 126, if the distance between the deflector arm 24 and second portion 126*b* is less than the thickness of the RJ connector body, the resilient stabilizing element 126 flexes as it is slipped over the body. This flexing results in resilient stabilizing element 126 applying a gripping force on at least a portion of the body of the RJ connector plug.

For a resilient stabilizing element, as a non-limiting example, if a typical thickness for an RJ45 connector plug is ⅜ inches, then the minimum spacing between deflector arm 24 and second portion 126*b* could be approximately 0.35 inches, depending upon the resiliency of resilient stabilizing element 126 and the amount of grasping force desired. This would require that resilient stabilizing element 126 flex approximately 0.025 inches when slipped over the body of the RJ connector plug. The length of second portion 126*b*, as shown in the representative embodiment of FIG. 4, is on the order of 0.35 inches. A person of ordinary skill in the art could readily determine the appropriate dimensions of resilient stabilizing element 126 for a given material and a desired grasping force.

Resilient stabilizing element 126 may be formed from any resilient material, including metals, plastics and composite materials, allowing at least a portion of resilient stabilizing arm 126 to elastically deform. As a non-limiting example, flat or round spring steel may be shaped to form resilient stabilizing element 126. Persons of ordinary skill in the art would appreciate that other resilient stabilizing element configurations, such as configurations incorporating resilient elements (i.e. rotational or other springs) and/or incorporating relatively non-resilient elements, may also be used.

Figure 5A:
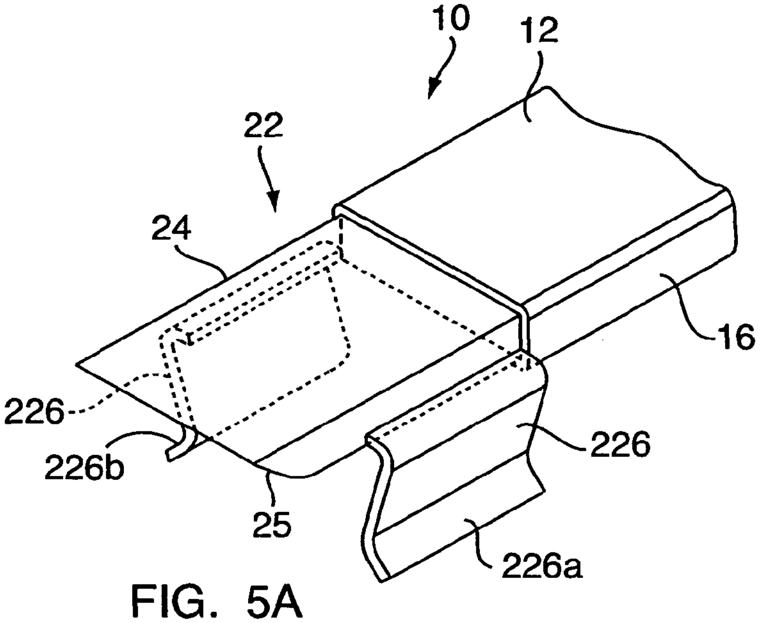
FIG. 5A is a schematic perspective view of tool, showing a grasping element according to an alternative representative embodiment.
Figure 5B:
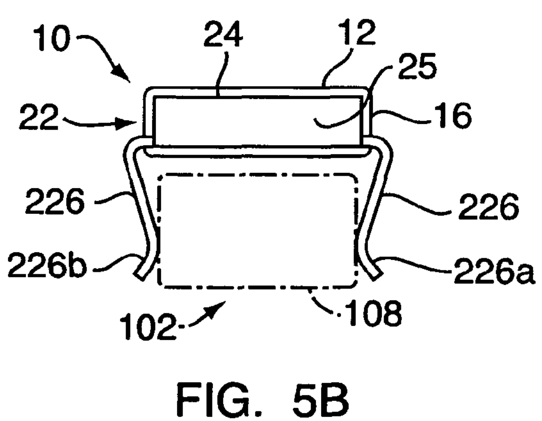
FIG. 5B is a schematic end view of the tool shown in FIG. 5A.

In an alternative representative embodiment as shown in FIGS. 5A and 5B, stabilizing element 226 includes portions 226*a* and 226*b*. Relatively flat, plate-like portions 226*a* and 226*b* extend along opposite longitudinal edges of deflector arm 24 such that the body of the RJ connector plug is located therebetween. The distal most edge of portions 226*a* and 226*b* may be slightly flared to facilitate slipping stabilizing element over the body of the plug. As with the embodiment of FIG. 2, the stabilizing element 226 of the embodiment of FIGS. 5A and 5B may be resilient and designed to apply a gripping force to the body of the RJ connector plug.

Referring back to the embodiment shown in FIG. 2, tool 10 may also include an insertion portion 32 coupled to second end portion 30. Insertion portion 32 is used to plug the RJ connector plug into the connector receptacle. In particular, insertion portion 32 provides a reliable and efficient means to align and fully insert the plug into the connector receptacle without disturbing adjacent connectors. Insertion portion 32 includes an insertion arm 34 and stabilizing element 36.

Insertion arm 34 extends longitudinally in a distal direction from second end portion 30 of handle 12. As with deflector arm 24, insertion arm 34 may be an extension of central core 14 of handle 12 or it may be a separate element affixed to second end portion 30. As shown in FIG. 2, insertion arm 34 may be provided with a slanted or ramped leading edge 35. Ramped leading edge 35 provides a surface for insertion arm 34 to contact the free end of the locking tab of the RJ connector plug and to drive the free end of the locking tab away from the body of the RJ connector plug as insertion arm 34 is pushed over the proximal end of the plug. This allows the user to ensure that locking tab is positively engaged with the complementary inner edge of the connector receptacle. Although insertion arm 34 may be any length consistent with extending over at least a portion of the length of an RJ connector plug and contacting the free end of the locking tab, in the embodiment shown in FIG. 2, the length of insertion arm 34 is approximately ⅜ inches.

Similar to extraction portion 22, and as shown in FIG. 2, insertion portion 32 also includes one or more stabilizing elements 36. Stabilizing element 36 may be similar or identical to stabilizing element 26. Further, a resilient stabilizing element 136, similar or identical to resilient stabilizing element 126 as disclosed above, may be provided (see FIGS. 10A through 10C).

Figure 6:
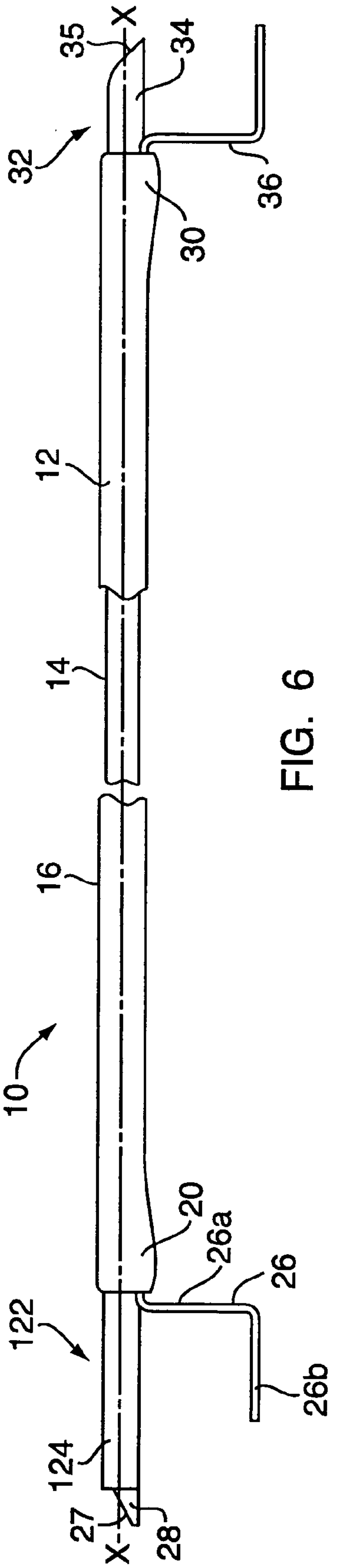
FIG. 6 is a schematic side view of a tool according to an embodiment of the present invention.
Figure 7:
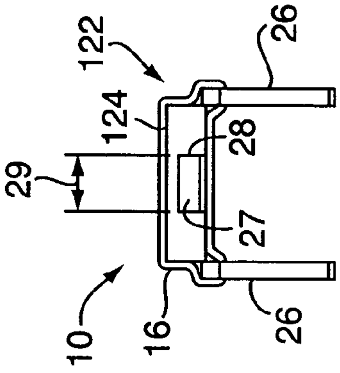
FIG. 7 is a schematic end view of the tool shown in FIG. 6.

In another representative embodiment as shown in FIGS. 6 and 7, the extraction portion 122 of tool 10 differs from the embodiment of FIGS. 2 and 3. In particular, extraction portion 122 includes deflector arm 124. All other similarly numbered items remain as disclosed above. Deflector arm 124 extends longitudinally in a distal direction from first end portion 20 of handle 12. As shown in FIG. 6, deflector arm 124 may be provided with a leading edge projection 28. Leading edge projection 28 has a ramped surface 27 and a width 29 (see FIG. 7). The ramped surface 27 is angled away from stabilizing element 26. The width 29 is less than or equal to the width of the locking tab of the RJ connector plug. As deflector arm 124 is pushed over the proximal end of the plug, projection 28 drives the free end of the locking tab in towards the body of the RJ connector plug.

Figure 8C:
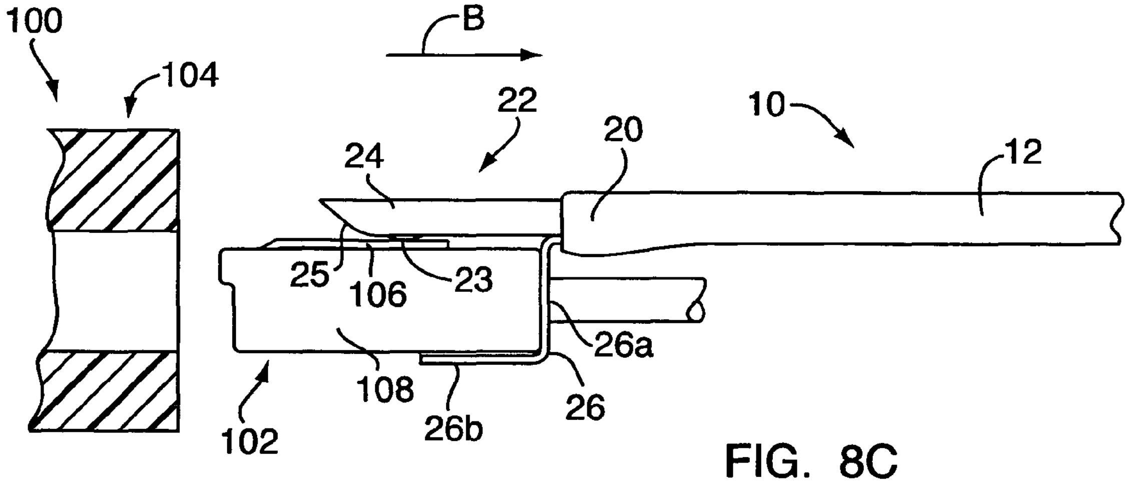

With respect to extracting an RJ connector plug from a connector receptacle using the embodiment of tool 10 shown in FIGS. 2 and 3, reference may be made to FIGS. 8A through 8C. In FIG. 8A, deflector arm 24 of tool 10 is shown positioned adjacent to an RJ connector plug. At the start of the extraction process, tool 10 and deflector arm 24 are positioned roughly parallel to the body of the RJ connector plug, with deflector arm 24 being placed on the side of the RJ connector plug on which the locking tab is located. The user then moves tool 10, and deflector arm 24, approximately along its longitudinal axis in a distal direction (arrow A), parallel to the body of the plug. This brings deflector arm 24, and in particular, leading edge 25 of deflector arm 24, into contact with the free end of the locking tab. At the same time as deflector arm 24 is moved adjacent the body of the plug, stabilizing element 26 is slipped over the proximal end of the body of the plug. Further moving tool 10 in the distal direction causes the locking tab to deflect in toward the body of the plug. During the process of deflecting the locking tab, stabilizing element 26 prevents deflector arm 24 from losing contact with the locking tab. In FIG. 8B, deflector arm 24 has been positioned so that its leading edge 25 is in contact with, or in near contact with, either the RJ connector receptacle or a wall of the appliance in which the connector receptacle is located. In this position, deflector arm has fully deflected locking tab toward the body of the plug. Optional button 23 provides a further mechanical advantage to ensure that locking tab is fully deflected and no longer engaging the connector receptacle. In FIG. 8C, tool 10 has been moved approximately along its longitudinal axis in the proximal direction (arrow B). During this movement in the proximal direction, the user may grasp both the handle portion 12 of tool 10 and the cable of the RJ connector plug with one hand. Due to the disengagement of the locking tab from the connector receptacle by deflector arm 24, the RJ connector plug is extracted from the connector receptacle.

Figure 9C:
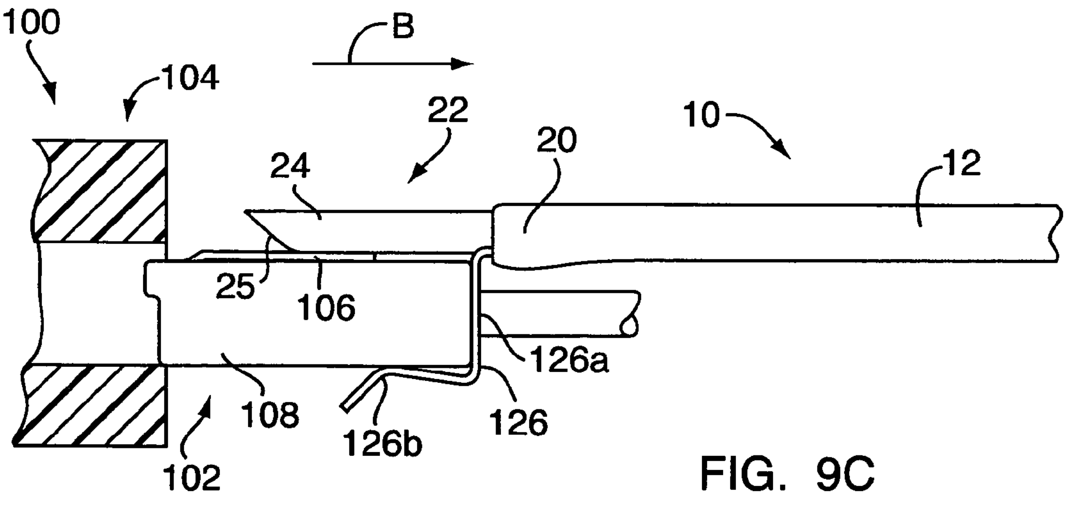

With respect to extracting an RJ connector plug from a connector receptacle using the embodiment of tool 10 shown in FIG. 4, reference may be made to FIGS. 9A through 9C. In FIG. 9A, deflector arm 24 of tool 10 is shown positioned adjacent and roughly parallel to an RJ connector plug. As with the method disclosed in FIGS. 8A through 8C, the user moves tool 10, and deflector arm 24, approximately along its longitudinal axis in a distal direction (arrow A), parallel to the body of the plug to bring leading edge 25 of deflector arm 24 into contact with the free end of the locking tab. At the same time as deflector arm 24 is moved adjacent the body of the plug, resilient stabilizing element 126 is slipped over the proximal end of the body of the plug. During the process of slipping resilient stabilizing element 126 over the body of the plug, resilient stabilizing element 126 is elastically deformed, resulting in a gripping force being applied to the body of the plug. Further moving tool 10 in the distal direction causes the locking tab to deflect in toward the body of the plug. In FIG. 9B, deflector arm has fully deflected locking tab toward the body of the plug and resilient stabilizing element 126 is resiliently gripping the body of the plug. In FIG. 9C, tool 10 has been moved in the direction of arrow B. During this movement in the proximal direction, the user may grasp both the handle portion 12 of tool 10 and the cable of the RJ connector plug with one hand. Due to the disengagement of the locking tab from the connector receptacle by deflector arm 24 and assisted by the gripping force applied by resilient stabilizing element 126 to the body of the plug, the RJ connector plug is extracted from the connector receptacle.

To extract an RJ connector plug from a connector receptacle using the embodiment of tool 10 shown in FIGS. 5A and 5B, the same process as disclosed above for the embodiment of FIGS. 2 and 3 may be followed.

Figure 10A:
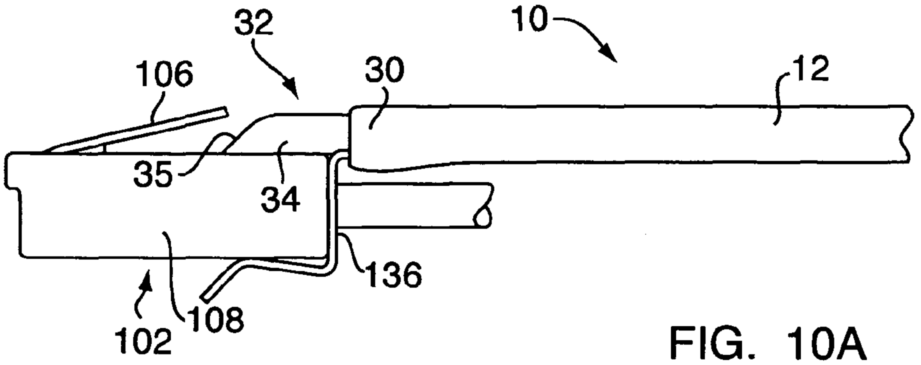
FIGS. 10A through 10C show the insertion of an RJ connector plug using the tool of FIG. 2 with a resilient stabilizing element.
Figure 10B:
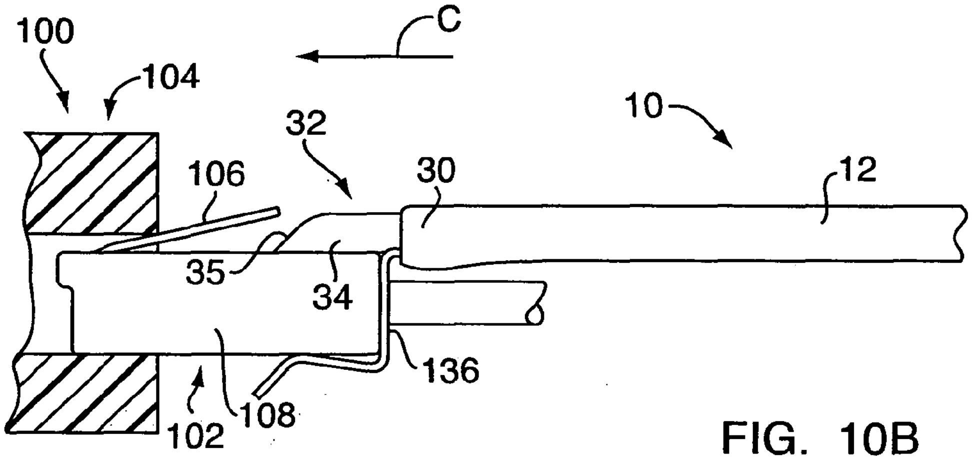
Figure 10C:
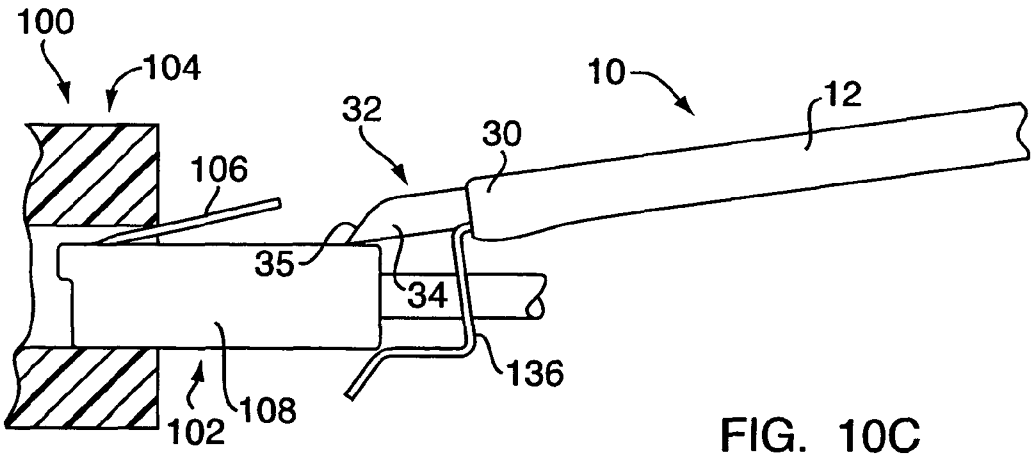

With respect to inserting an RJ connector plug into a connector receptacle using the embodiment of tool 10 shown in FIGS. 2 and 3 with a resilient stabilizing element 136, reference may be made to FIGS. 10A through 10C. At the start of the insertion process, as shown in FIG. 10A, an RJ connector plug is manually positioned between insertion arm 34 and resilient stabilizing element 136. Note that in this position, the locking tab is undeflected and extends at an angle to the body of the plug. As shown in FIG. 10B, tool 10, with the RJ connector plug gripped by resilient stabilizing element 136, is then aligned with the opening in the connector receptacle. The user then moves tool 10 approximately along its longitudinal axis in a distal direction (arrow C) to insert the distal portion of the RJ connector plug into the connector receptacle until the locking tab snaps into engagement with the inner locking edge of the connector receptacle. Depending upon the length of insertion arm 34 relative to the length of the body of the plug, leading edge 35 of insertion arm 34 may contact the free end of the locking tab. Because leading edge 35 is ramped away from the body of the plug, the free end of the locking tab is driven away from the body, thereby ensuring that the locking tab snaps into engagement with the connector receptacle. In FIG. 10C, tool 10 has been angled away from the body of the plug so that resilient stabilizing element 136 is slipped off from around the body, thereby releasing its resilient gripping force on the body and allowing the removal of tool 10 from the plug.

Figure 11A:
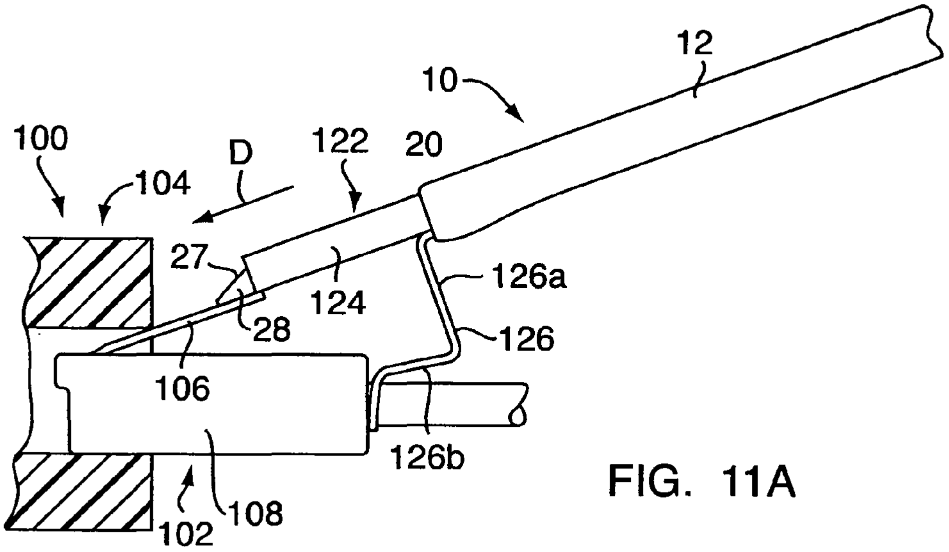
FIGS. 11A through 11C show the extraction of an RJ connector plug using the tool of FIG. 6 with a resilient stabilizing element.
Figure 11B:
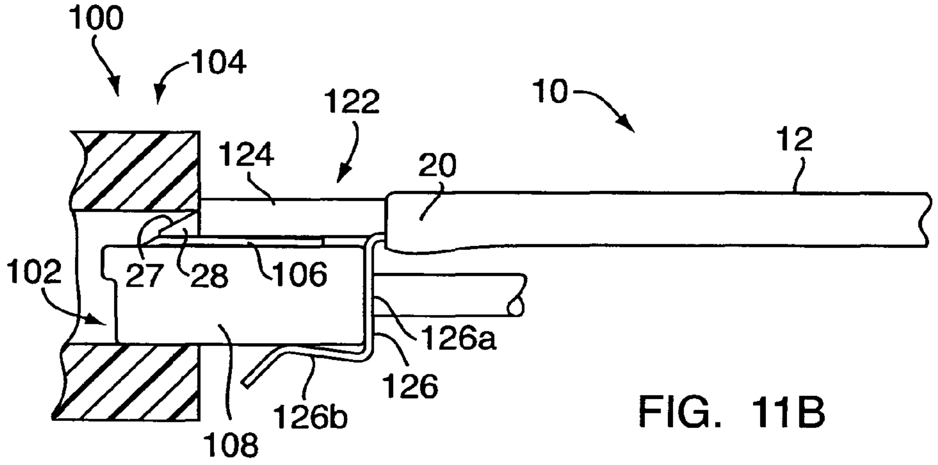
Figure 11C:
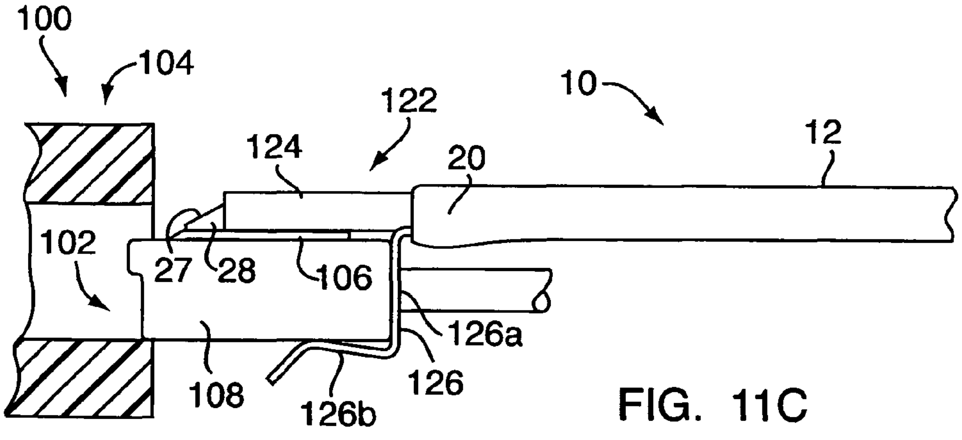

With respect to extracting an RJ connector plug from a connector receptacle using the embodiment of tool 10 shown in FIGS. 6 and 7 with resilient stabilizing arm 126, reference may be made to FIGS. 11A through 11C. In FIG. 11A, deflector arm 124 of tool 10 is shown positioned adjacent to an RJ connector plug. At the start of the extraction process, tool 10 and deflector arm 124 are positioned at an angle to the body of the RJ connector plug, with deflector arm 124 being placed on the side of the RJ connector plug on which the locking tab is located. The user then moves tool 10, and deflector arm 24, approximately along its longitudinal axis in a distal direction (arrow D). This brings deflector arm 124, and in particular, leading edge protrusion 28 of deflector arm 124, into contact with the outside surface of the locking tab. Further moving tool 10 in direction D causes the locking tab to deflect in toward the body of the plug. At the same time as deflector arm 124 is moved adjacent the body of the plug, resilient stabilizing element 126 is slipped over the proximal end of the body of the plug. During the process of slipping resilient stabilizing element 126 over the body of the plug, resilient stabilizing element 126 is elastically deformed, resulting in a gripping force being applied to the body of the plug. In FIG. 11B, deflector arm 124 has been positioned so that protrusion 28 is inserted within connector receptacle in the vicinity of the locking tab. The insertion of protrusion 28 into the connector receptacle results in a fully deflected locking tab and the breaking of the engagement of locking tab with the inner locking edge of the connector receptacle. As with the embodiment of FIGS. 9A through 9C, the RJ connector plug is now resiliently gripped by resilient stabilizing element 126. In FIG. 11C, tool 10 has been moved approximately along its longitudinal axis in the proximal direction (arrow E). During this movement in the proximal direction, the user may grasp both the handle portion 12 of tool 10 and the cable of the RJ connector plug with one hand. Due to the disengagement of the locking tab from the connector receptacle by deflector arm 124 and assisted by the gripping force applied by resilient stabilizing element 126 to the body of the plug, the RJ connector plug is extracted from the connector receptacle.

Since certain changes may be made in the above-described tool for extracting and/or inserting electrical connectors without departing from the spirit and scope of the invention herein involved, it is intended that all of the subject matter of the above description or shown in the accompanying drawings shall be interpreted merely as examples illustrating the inventive concept herein and shall not be construed as limiting the invention. Those skilled in the art will readily recognize that various modifications, arrangements and methods can be made to the present invention without strictly following the exemplary applications illustrated and described herein and without departing from the spirit and scope of the present invention It is therefore contemplated that the appended claim swill cover any such modifications or embodiments as fall within the true scope of the invention.

We claim:

1. A tool for extracting a connector having an external locking tab from a connector receptacle to which the locking tab releasably fastens the connector, the tool comprising: a tool body having an elongated shape with a first end and a second end, wherein the first end is adapted to engage the locking tab of the connector, and wherein the first end includes a first stabilizing element, the first end and first stabilizing element forming an opening into which the connector and the locking tab may be positioned.

2. The tool of claim 1 wherein the first end of the tool includes an angled surface for engaging the locking tab.

3. The tool of claim 2 wherein the angled surface fits at least partially into the connector receptacle.

4. The tool of claim 1 wherein the first end includes a plurality of first stabilizing elements.

5. The tool of claim 1 wherein the first end further includes a button to engage the locking tab.

6. The tool of claim 1 wherein the second end is adapted to engage the connector.

7. The tool of claim 6 wherein the second end includes an angled surface.

8. The tool of claim 6 wherein the second end includes a second stabilizing element.

9. The tool of claim 8 wherein at least one of the first and the second stabilizing elements comprise resilient properties.

10. The tool of claim 8, wherein the second end includes a plurality of second stabilizing elements.

11. A tool for extracting a connector from a connector receptacle or for inserting the connector into the connector receptacle, the tool comprising: a tool body having an elongated shape with a first end and a second end wherein the first end is adapted to engage and stabilize the connector and to form an opening into which the connector and the locking tab may be positioned for deflecting the locking tab of the connector toward the connector.

12. The tool of claim 11 wherein the first end includes an arm to engage the locking tab of the connector and a stabilizing element to engage a body of the connector.

13. The tool of claim 12 wherein the arm includes an angled surface for engaging the locking tab.

14. The tool of claim 13 wherein the angled surface fits at least partially into the connector receptacle.

15. The tool of claim 12 wherein the stabilizing element comprises resilient properties.

16. The tool of claim 11 wherein the second end is adapted to engage and stabilize the connector and wherein the second end includes an arm to engage a locking tab of the connector and wherein the second end includes a stabilizing element to engage a body of the connector.

17. A tool for extracting or inserting a connector having a connector body and having a locking tab for releasably fastening the connector into a receptacle, the tool comprising an elongated tool body having first and second ends, the first end having a first stabilizing element for engaging the connector body and having a first arm, the first stabilizing element and the first arm forming an opening into which the connector and the locking tab may be positioned for deflecting the locking tab toward the connector body, and the second end having a second stabilizing element for gripping the connector body and having a second arm for deflecting the locking tab away from the connector body.

18. The tool according to claim 17, wherein at least one of the first stabilizing element and the second stabilizing element is formed to be essentially rigid in use.

19. The tool according to claim 17, wherein at least one of the first stabilizing element and the second stabilizing element is formed to be resilient in use.

* * * * *